United States Patent
Gray et al.

(10) Patent No.: US 6,684,656 B2
(45) Date of Patent: Feb. 3, 2004

(54) LOW ENERGY APPLIANCE CONTROL APPARATUS AND METHOD

(75) Inventors: Steven J. Gray, Erie, PA (US); Martin M. Zenter, Prospect, KY (US); Samuel V. DuPlessis, Louisville, KY (US); Scott Russell King, Prospect, KY (US); Ramesh Janardhanam, Louisville, KY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/113,822

(22) Filed: Mar. 29, 2002

(65) Prior Publication Data

US 2003/0182958 A1 Oct. 2, 2003

(51) Int. Cl.[7] .............................. F25B 1/00; F25D 21/06
(52) U.S. Cl. ........................................... 62/229; 62/276
(58) Field of Search .................... 62/229, 276, 157, 62/228.1, 231; 236/DIG. 9

(56) References Cited

U.S. PATENT DOCUMENTS

| | | | |
|---|---|---|---|
| 4,197,717 A | | 4/1980 | Schumacher |
| 4,449,664 A | * | 5/1984 | Mithuhira et al. ............. 236/49 |
| 4,843,833 A | * | 7/1989 | Polkinghorne ................ 62/180 |
| 5,474,213 A | | 12/1995 | Unger |
| 5,638,083 A | * | 6/1997 | Margeson ..................... 345/10 |
| 5,651,264 A | * | 7/1997 | Lo et al. ........................ 62/230 |
| 5,675,503 A | * | 10/1997 | Moe et al. .................... 364/492 |
| 5,711,160 A | * | 1/1998 | Namisniak et al. ........... 62/125 |
| 5,737,232 A | | 4/1998 | Wetekamp |
| 5,918,474 A | | 7/1999 | Khanpara et al. |
| 5,927,598 A | * | 7/1999 | Broe ......................... 236/46 E |
| 5,996,361 A | | 12/1999 | Bessler et al. |
| 6,167,524 A | * | 12/2000 | Goodnow et al. .......... 713/300 |
| 6,293,471 B1 | * | 9/2001 | Stettin et al. ............. 236/20 R |
| 6,343,477 B1 | | 2/2002 | Mandel et al. |
| 2002/0108010 A1 | * | 8/2002 | Kahler et al. ................ 710/305 |

* cited by examiner

Primary Examiner—Marc Norman
(74) Attorney, Agent, or Firm—H. Neil Houser, Esq.; Armstrong Teasdale LLP

(57) ABSTRACT

An apparatus and method for operating an appliance in an energy conservation mode is described. The appliance includes a number of peripheral devices and auxiliary components ancillary to main operation of the appliance, and the method includes reducing power to at least some of the peripheral devices and auxiliary components in an energy conservation mode, thereby reducing energy consumption by the peripheral devices and auxiliary components.

18 Claims, 8 Drawing Sheets

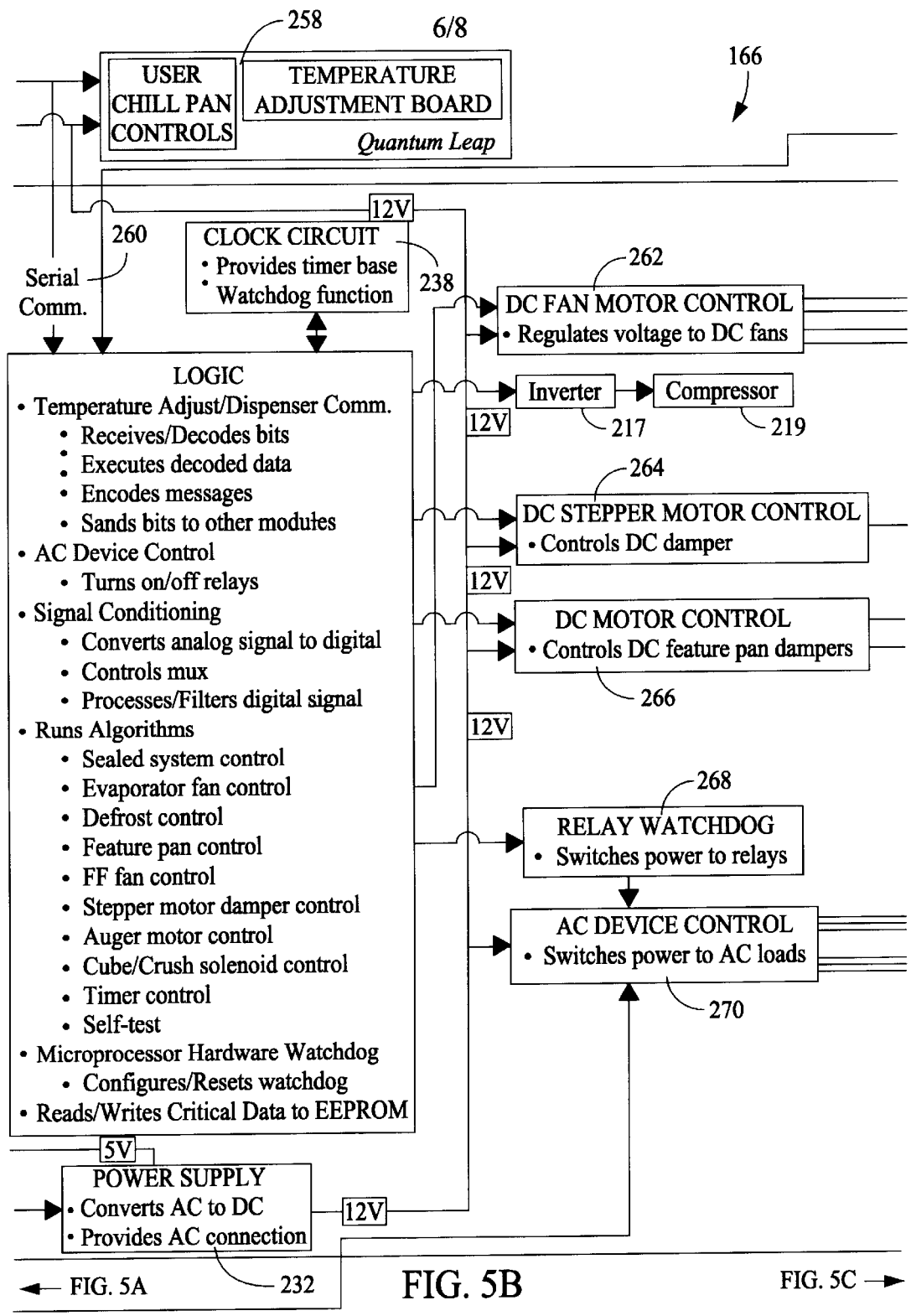

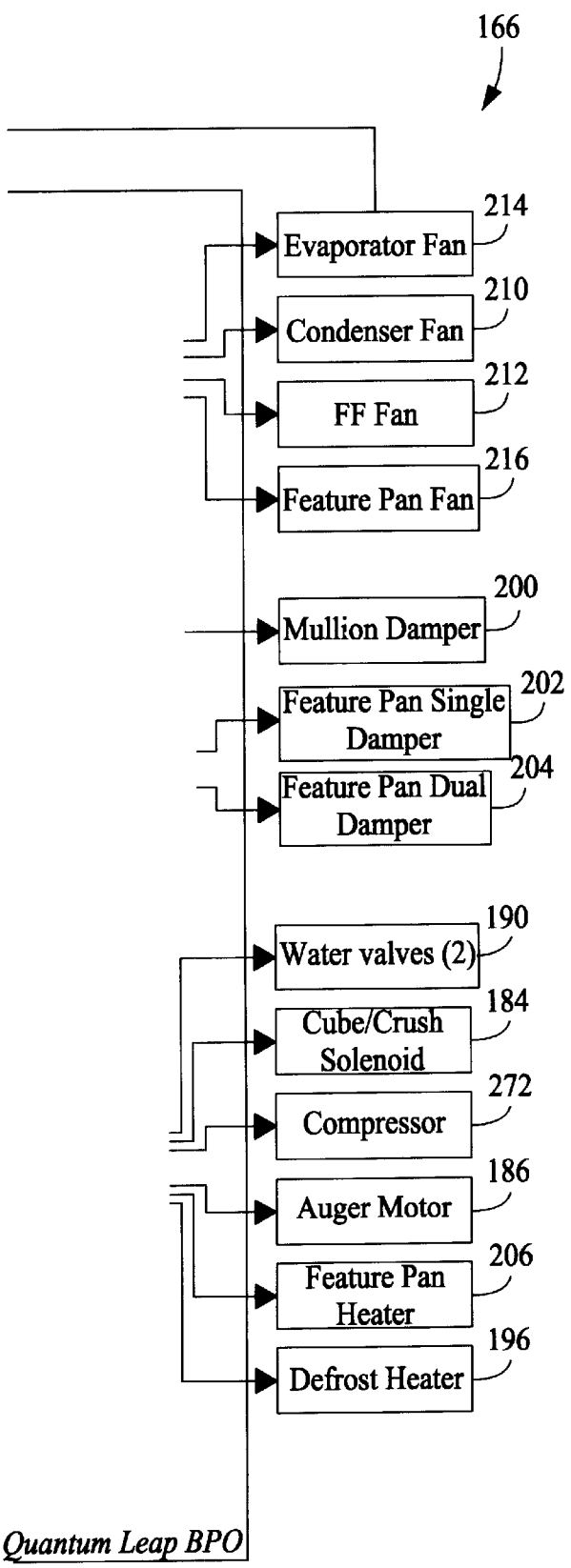
← FIG. 5B    FIG. 5C

LOW ENERGY APPLIANCE CONTROL APPARATUS AND METHOD

BACKGROUND OF THE INVENTION

This invention relates generally to household appliances, and more particularly, to appliance control systems.

Modern household appliances often include a large number of components and features that enhance performance and convenience of the appliance. Managing these appliance components and features from an energy consumption perspective is a growing concern to manufacturers that must meet applicable energy consumption requirements and criteria.

Modern refrigerators, for example, typically include a compressor, an evaporator, and a condenser in a closed refrigeration circuit, and a number of fans and dampers that facilitate the refrigeration circuit and direct cooled air into refrigeration compartments. Collectively, these components perform the basic essential cooling functions of the refrigerator. Additionally, refrigerators typically include a number of auxiliary and peripheral devices, including auxiliary fans, icemakers, dispensing devices for ice and water, and defrost units that perform ancillary functions beyond the basic cooling requirements of the refrigerator. In some refrigerators, separate temperature controlled storage compartments or drawers include fans, dampers, and controls for quick chilling or long term storage at temperatures independent of the main refrigeration compartments. Still further, a plurality of lighting components, displays, and audio indicators may be associated with the foregoing basic or ancillary features and components. Conventionally, the consumer has no control over the energy performance of these and other components of the refrigerator.

BRIEF DESCRIPTION OF THE INVENTION

In one aspect, a method for operating an appliance in an energy conservation mode is provided. The appliance includes a number of peripheral devices and auxiliary components ancillary to main operation of the appliance, and the method comprises reducing power to at least some of the peripheral devices and auxiliary components in an energy conservation mode corresponding to an appliance set point, thereby reducing energy consumption by the peripheral devices and auxiliary components.

In another aspect, a method for operating a refrigerator in an energy conservation mode is provided. The refrigerator includes at least one refrigeration compartment and a sealed system for forcing cold air therethrough, and a number of peripheral devices and auxiliary components. The method comprises operating the sealed system at normal temperature setting in a normal mode of operation, and disabling at least one of the peripheral devices and auxiliary components at a predetermined temperature setting corresponding to an energy conservation mode, thereby preventing the disabled peripheral device and auxiliary component from consuming energy.

In another aspect, a method for controlling a refrigerator is provided. The refrigerator includes at least one refrigeration compartment and a sealed system for forcing cold air therethrough. The refrigerator further includes a number of peripheral devices and auxiliary components, and the refrigerator is operable at a number of temperature settings through a controller. The method comprises accepting a target temperature set point for the at least one refrigeration compartment; operating the sealed system in normal operation according to the accepted setting; when a designated low energy mode setting is accepted, suspending operation of at least one of the peripheral devices and auxiliary components, thereby preventing the disabled peripheral device and auxiliary component from consuming energy; and operating the peripheral devices and auxiliary components on demand when the accepted setting is other than the designated setting.

In another aspect, a controller for an appliance including a number of peripheral devices and auxiliary components ancillary to main operation of the appliance, is provided. The controller is configured to be operatively coupled to each of said peripheral devices and auxiliary components, and the controller is configured to operate said peripheral devices and auxiliary components in a normal mode of operation corresponding to a normal set point for the appliance, and to alter operation of said peripheral devices and auxiliary components when a low energy mode is activated through selection of a predetermined setpoint.

In another aspect, a controller for a refrigerator including at least one refrigeration compartment, a sealed system for cooling the at least one compartment, and a number of peripheral devices and auxiliary components ancillary to cooling functions of the refrigerator is provided. The controller is configured to be operatively coupled the sealed system and to each of the peripheral devices and auxiliary components. The controller is configured to operate said sealed system, peripheral devices, and auxiliary components in a normal mode of operation according to user preferences, and adjust operation of said peripheral devices and auxiliary components when a low energy mode is activated through selection of a predetermined sealed system set point, thereby reducing energy consumption by the peripheral devices and auxiliary devices.

In another aspect, a refrigerator is provided. The refrigerator comprises a cabinet, at least one refrigeration compartment within said cabinet, a sealed system in flow communication with said cabinet, a controller coupled to the sealed system for controlling an operating temperature of said at least one refrigeration compartment; and at least one device coupled to said controller and ancillary to operation of said sealed system. The controller is configured to control said sealed system and said device in a normal mode corresponding to a normal temperature set point, and to operate said device in a low energy mode temperature corresponding to a low energy mode temperature set point to reduce energy consumption by said device.

BRIEF DESCRIPTION OF THE DRAWINGS

FIGS. 5A–5C is a block diagram of the main control board shown in Figure.

DETAILED DESCRIPTION OF THE INVENTION

Figure 1:
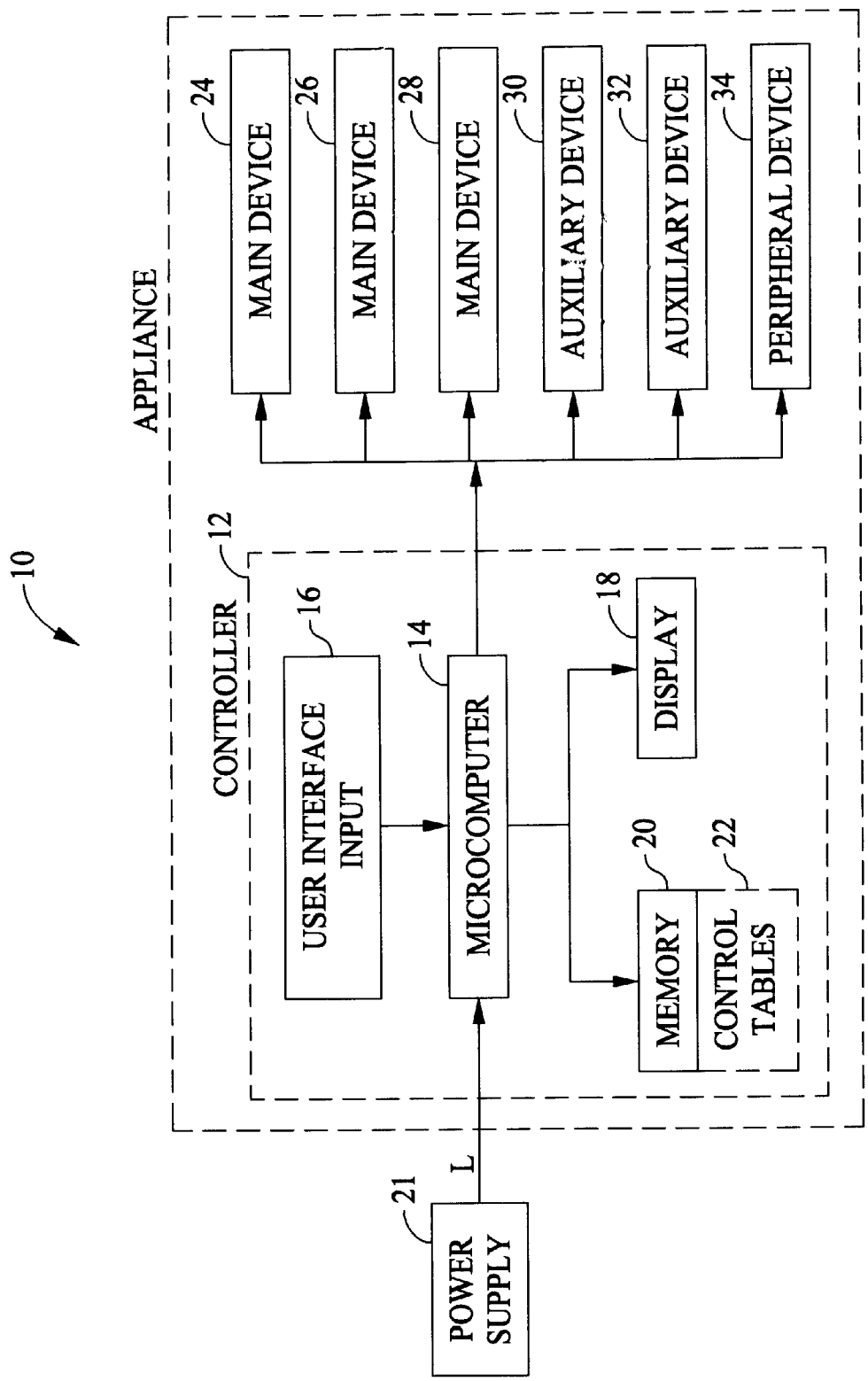
FIG. 1 is a schematic block diagram of an appliance.

FIG. 1 is a schematic block diagram of an illustrative appliance 10 operable in a low energy mode or energy conservation mode Appliance 10 includes a controller 12 which may, for example, be a microcomputer 14 coupled to a user interface input 16. An operator may enter instructions or select desired appliance options and features via user interface input 16, and a display 18 coupled to microcomputer 14 displays appropriate messages, indicators, a timer, clock or other known items of interest to appliance users. A memory 20 is also coupled to microcomputer 14 and stores instructions, calibration constants, and other information as required to satisfactorily complete a selected appliance instruction via user interface 16. Memory 20 may, for example, be a random access memory (RAM). In alternative embodiments, other forms of memory could be used in conjunction with RAM memory, including but not limited to electronically erasable programmable read only memory (EEPROM).

It is contemplated that the general methodology described below and at least some of the ensuing benefits could be achieved using known mechanical or electromechanical control mechanisms in lieu of an electronic controller, such as controller 12. Moreover, interface input 16 may be any known interface, including but not limited to knobs, dials, switches, buttons, and touch sensitive membranes. Further, control inputs may be received via a remote computer link according to known methods.

Power to appliance 10 is supplied to controller 12 by a power supply 21 configured to be coupled to a power line L. Analog to digital and digital to analog converters (not shown) are coupled to controller 12 to implement controller inputs and executable instructions to generate controller output to a number of main devices 24, 26, 28, auxiliary devices 30, 32, and a peripheral device 34 according to known methods. As used, herein, a "main" device refers a device that is required for operating the device at its most basic or minimum level to accomplish the basic function of the appliance. Thus, if appliance 10 is a cooling appliance, such as a refrigerator, the main devices include the basic cooling components. If appliance 10 is a heating appliance the main devices include the basic heating elements. If appliance 10 is a washing appliance, the main devices include the basic fluid circulation components (e.g., pumps) and applicable drive components (e.g., agitator and spin components).

As used, herein, an "auxiliary" device is a device that assists in the function of the main devices, but is ancillary to the main devices. In other words, auxiliary devices 30, 32 are of some benefit to the main function of appliance 10, but only secondarily. For example, in a cooling appliance the auxiliary devices may include auxiliary fans that assist and enhance airflow but are not required for cooling to be achieved. For a heating appliance, an auxiliary device may include an extra convection fan or a warmer element that assists in the appliance main function (e.g., cooking) but is not necessary for cooking to occur. For a cleaning appliance, auxiliary devices may include, for example, a heating element for drying dishes in a dishwasher. Thus, auxiliary devices may be referred to as enhancing the basic function of the device, but not necessary for the device to accomplish its basic function.

As used herein, a "peripheral" device is a device unrelated to the basic function of appliance 10. For example, in a refrigeration appliance icemakers and dispensers may be considered to be peripheral devices, as well as temperature controlled chambers or drawers operated independently of the main refrigeration compartments. Additionally, displays (including display 18), indicators (audio and visual) and lighting features may be considered peripheral devices. Thus, peripheral devices may be referred to as ancillary devices serving primarily convenience purposes for a user.

It is understood that a given appliance 10 may include any number of main devices, auxiliary devices, and peripheral devices.

Controller memory 20 includes, in one embodiment, a number of control tables 22 including calibration constants, control data and parameters relating to operable main, auxiliary and peripheral devices 24–34 of appliance 10. One of these control tables includes, in one embodiment, a coded scheme of parameters classifying appliance devices as "main", "auxiliary" or "peripheral." Using these classifications or designations, controller 12 may operate appliance 10 in a low energy mode or energy conservation mode to reduce energy consumption by appliance 10 while maintaining the basic, low level operation of appliance 10. When the user enters a predetermined input through interface 16, controller 12 switches appliance 10 from a normal operating mode to a low energy mode. In the normal mode all devices are available for operation on demand per user instruction or control directives of controller 12. In the low energy mode, operation of auxiliary devices and peripheral devices is adjusted to reduce energy consumption of appliance 10 while maintaining operation of main devices. Thus, appliance 10 may be selectively operated in a normal mode or a low energy mode as desired, and as explained below.

Figure 2:
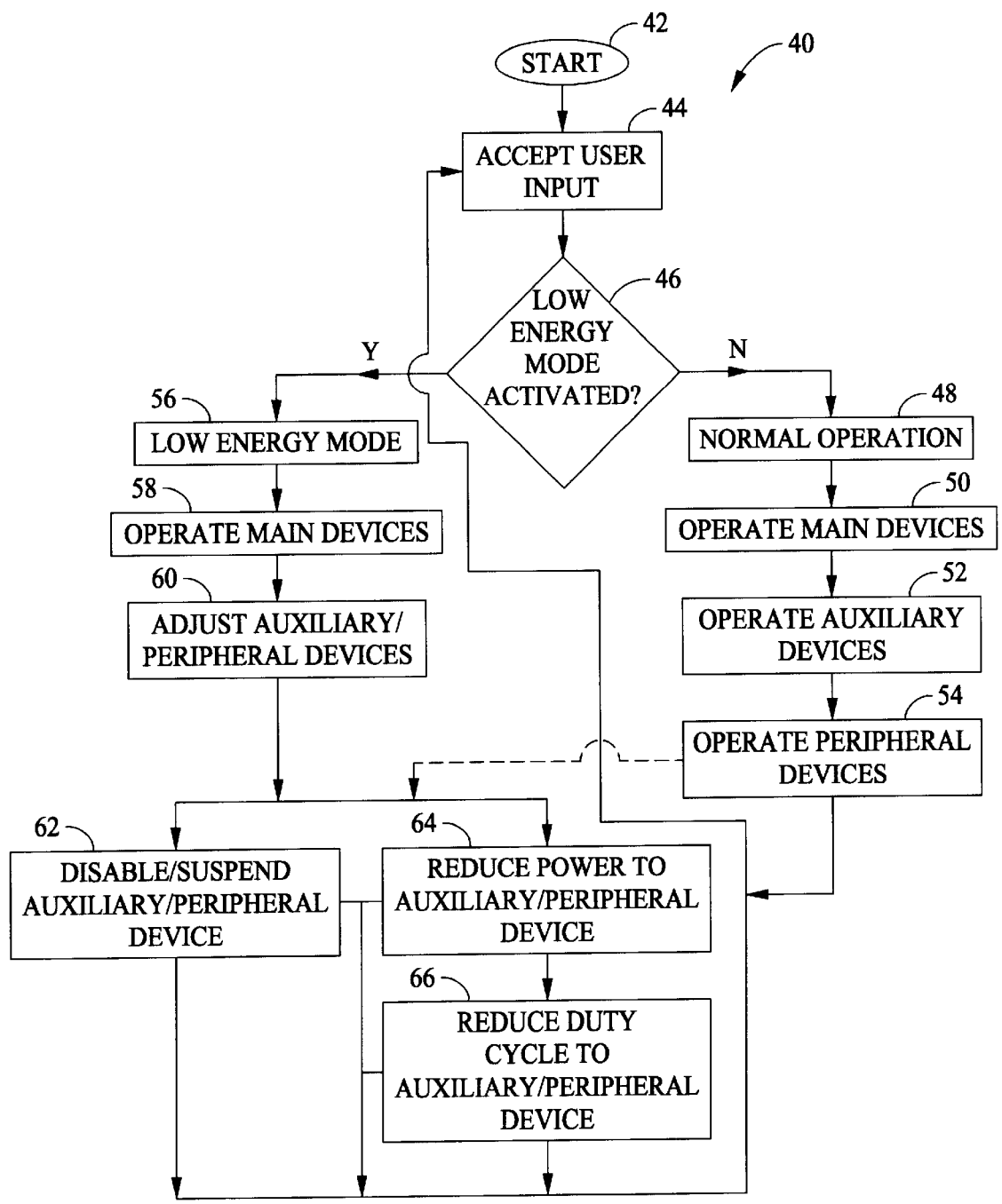
FIG. 2 is a control algorithm for the appliance shown in FIG. 1.

FIG. 2 is a flow chart of a control algorithm 40 executable by controller 12 (shown in FIG. 1) to operate appliance 10 (shown in FIG. 1) in a normal mode and a low energy mode or energy conservation mode.

Algorithm begins 42 by accepting 44 a user-selected control input via manipulation of interface 12 (shown in FIG. 2). In an illustrative embodiment, the input is an appliance set point relating to main operation of appliance 10. For example, a user may input a desired fresh food compartment temperature set point, freezer compartment temperature set point, or both, in a control interface of a refrigerator. Once the control input is accepted 44, controller 12 determines 46 whether the accepted input matches a predetermined input corresponding to the low energy mode. Thus, in an exemplary embodiment one of the appliance set points corresponds to the low energy mode, and when that setting is input by a user, the low energy mode is activated, while in other set points, or "normal" set points, the low energy mode is not activated. For example, setting of a refrigerator fresh food compartment, freezer compartment, or both, to its highest or warmest temperature set point triggers activation of the low energy mode in an exemplary embodiment, while other temperature settings result in the normal mode of operation.

If the low energy mode has not been activated 46 via the accepted input, appliance 10 operates 48 in a normal mode. Consequently, appliance main devices 24, 26, 28 (shown in FIG. 1) are operated 50 according to known techniques in a manner to accomplish the accepted input instruction. For example, in a refrigeration system controller 12 operates the main devices (i.e., the cooling components) to obtain a temperature of the fresh food compartment in accordance with the accepted instruction from step 44. Additionally, auxiliary devices 30, 32 (shown in FIG. 1) are operated 52 normally by controller 12 to assist operation 50 of the main devices as needed, and peripheral device 34 (shown in FIG. 1) is operated 54 upon request or upon demand. Thus, for example, a refrigerator icemaker and dispenser components, quick chill or temperature controlled chambers or drawers, and associated lights and indicators are fully functioning and responsive to user demand and control directives in the normal mode of operation.

If the low energy mode has been activated 46, appliance 10 operates 56 in a low energy or energy conservation mode.

Consequently, appliance main devices are 24, 26, 28 (shown in FIG. 1) are operated 58 according to known techniques in a manner to accomplish the accepted instruction. For example, in a refrigeration system, if the warmest temperature freezer compartment temperature setting activates the low energy mode, controller 12 operates the main devices (i.e., the cooling components) to maintain refrigeration compartment temperature at the warmest setting.

However, in the low energy mode, auxiliary devices 30, 32 (shown in FIG. 1) and peripheral device 34 are adjusted 60 by controller 12 to reduce energy consumption by the auxiliary and periphery devices. As illustrated in FIG. 2, this may be accomplished in two basic ways. The auxiliary and peripheral devices may be disabled 62 or suspended entirely from operation, such as by de-energizing electrical components of the devices and associated control interfaces, displays, etc. As such, the auxiliary and peripheral devices inactive and are generally non-responsive.

Alternatively, controller 12 may reduce 64 power to the auxiliary and peripheral devices. As such, auxiliary fans may be slowed, lights may be dimmed, etc. to reduce power consumption by the devices without cutting power to the components completely. In this mode, the auxiliary components and peripheral devices may be responsive but in a diminished capacity.

In a further embodiment, auxiliary and peripheral device power consumption may be reduced 64 by reducing 66 a duty cycle of one or more of the auxiliary or peripheral components. For example, a refrigerator dispenser mechanism may include a peripheral device heater to reduce or minimize undesirable condensation on dispenser components, and the duty cycle of the heater may be reduced to produce energy savings. Energy savings via decreasing the duty cycle may be realized even if the wattage of the heater is increased in a shortened duty cycle. Thus, because of increased wattage of the heater, albeit at a shorter duty cycle, no noticeable degradation of heater performance is incurred, while energy savings may be realized.

It is contemplated that the foregoing energy saving measures may be employed in combination. Thus, some auxiliary and peripheral devices may be disabled or suspended 62, some may be operated at reduced power 64, and some may be operated at a reduced cycle 66 at the same or different power levels than in the "normal" mode. In addition, it is contemplated that some of the foregoing energy saving measures could be implemented in the normal mode (particularly the reduced duty cycle measure) to reduce energy consumption in the normal mode. The normal mode and the low energy mode, however, are intended to be distinct modes of operation such that the appliance system exhibits distinct behavioral changes and energy consumption response between the normal mode and the low energy mode.

Whether in the low energy mode or the normal mode, controller 12 waits for further input to accept 44. When further input is accepted 44, controller 12 determines 46 whether the low energy mode has been activated, and algorithm 40 is repeated. The low energy mode may be deactivated in an exemplary embodiment through user selection of an input other than the input that activated the low energy mode. For example, if the warmest temperature set point activates the low energy mode in a refrigeration appliance activated the low energy mode, then user adjustment of the set point to a temperature other than the warmest setting will deactivate the low energy mode.

In an alternative embodiment, the low energy mode could be activated with a coded input sequence through interface 16 (shown in FIG. 1), and the low energy mode could be deactivated through coding of the input sequence. Thus, the low energy mode could be toggled on an off with a designated key sequence. In another embodiment, a dedicated selector, switch, knob, etc. could be employed to turn the low energy mode on and off. Thus, in various embodiments, the low energy mode may be consciously selected by a user, or the low energy mode may be substantially transparent and built in to the appliance set points for automatic activation and deactivation by controller 12 in response to one or more designated appliance set point inputs.

Still further, the low energy mode could be employed in varying degrees with different appliance set points. Thus, energy saving measures could be graduated with corresponding set points. In a refrigerator for example, in certain set points the low energy mode may be completely deactivated, in other set points be partially activated, and in still other set points may be wholly activated. In other words, it is contemplated that appliance 10 may be operate, partly in a normal mode and partly in a low energy mode at certain settings, while operating entirely in the normal mode or the low energy mode in other settings.

Algorithm 40 is considered to be generally beneficial to a wide variety of appliances, and is not intended to be limited in application to any particular heating, cooling or cleaning appliance. Algorithm 40, however, has been found to be particularly advantageous for use in a refrigerator, as further explained below.

Figure 3:
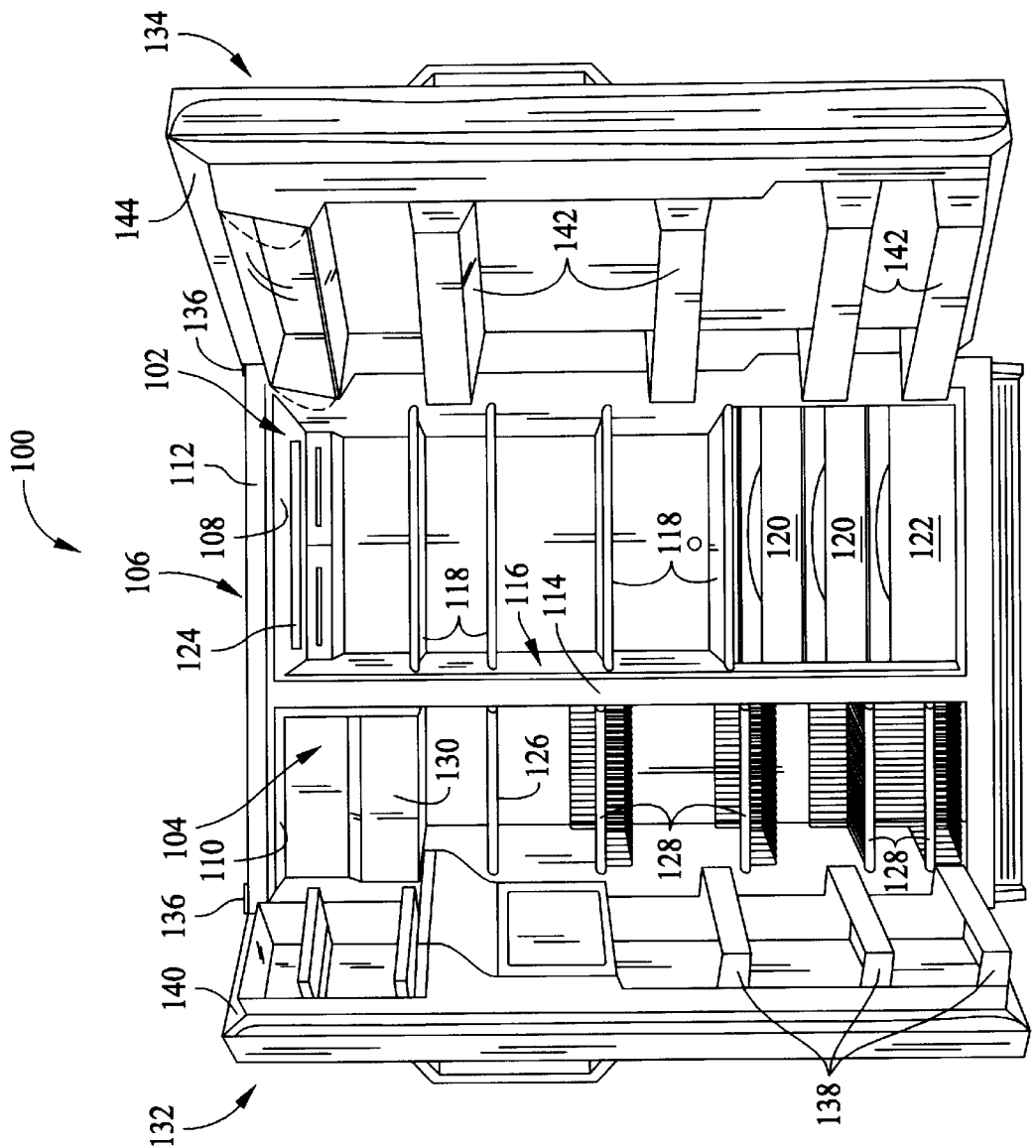
FIG. 3 is a perspective view of an exemplary refrigerator.

FIG. 3 illustrates an exemplary side-by-side refrigerator 100 that may operated in a normal mode and low energy mode as described above. It is recognized, however, that the benefits of the present invention apply to other types of appliances including single or multiple compartment refrigerators, single or multiple compartment freezers, combination refrigerator and freezers (including top mount systems), and other refrigeration devices, including but not limited to climate control systems, water coolers, wine coolers, ice makers, and vending machines having similar control issues and considerations. Consequently, the description set forth herein is for illustrative purposes only and is not intended to limit the invention in any aspect.

Refrigerator 100 includes a fresh food storage compartment 102 and a freezer storage compartment 104. Freezer compartment 104 and fresh food compartment 102 are arranged side-by-side in an outer case 106 with inner liners 108 and 110. A space between case 106 and liners 108 and 110, and between liners 108 and 110, is filled with foamed-in-place insulation or other known insulation material applied according to known techniques. Outer case 106 normally is formed by folding a sheet of a suitable material, such as pre-painted steel, into an inverted U-shape to form top and side walls of case. A bottom wall of case 106 normally is formed separately and attached to the case side walls and to a bottom frame that provides support for refrigerator 100.

Inner liners 108 and 110 are molded from a suitable plastic material to form freezer compartment 104 and fresh food compartment 102, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylo-butadiene-styrene based material (commonly referred to as ABS).

The insulation in the space between liners 108, 110 is covered by another strip of suitable resilient material, which also commonly is referred to as a mullion 114. Mullion 114 also preferably is formed of an extruded ABS material. It will be understood that in a refrigerator with separate mullion dividing a unitary liner into a freezer and a fresh food compartment, a front face member of Mullion corresponds to mullion 114. Breaker strip 112 and mullion 114 form a front face, and extend completely around inner peripheral edges of case 106 and vertically between liners 108, 110. Mullion 114, insulation between compartments 102, 104, and a spaced wall of liners 108, 110 separating compartments 102, 104 sometimes are collectively referred to herein as a center mullion wall 116.

Shelves 118 and slide-out drawers 120 normally are provided in fresh food compartment 102 to support items being stored therein. A bottom drawer or pan 122 partly forms a quick chill and thaw system that is selectively controlled, together with other refrigerator features, by a microprocessor (not shown in FIG. 3) according to user preference via manipulation of a control interface 124 mounted in an upper region of fresh food storage compartment 102 and coupled to the microprocessor. A shelf 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 3, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

In accordance with known refrigerators, refrigerator 100 also includes a machinery compartment (not shown) that at least partially contains components for executing a known vapor compression cycle for cooling air inside fresh food compartment 102 and freezer compartment 104 by transferring heat from the inside of refrigerator 100 and rejecting the heat to the outside of refrigerator 100. The components include a compressor (not shown in FIG. 3), a condenser (not shown in FIG. 3), an expansion device (not shown in FIG. 3), and an evaporator (not shown in FIG. 3) connected in series and charged with a refrigerant. The evaporator is a type of heat exchanger which transfers heat from air passing over the evaporator to a refrigerant flowing through the evaporator, thereby causing the refrigerant to vaporize and cool the evaporator surface, while heat is rejected in the condenser. The cooled air is used to refrigerate one or more refrigerator or freezer compartments via fans (not shown in FIG. 3). Collectively, the vapor compression cycle components in a refrigeration circuit, associated fans (e.g. an evaporator fan and a condenser fan), and associated compartments are referred to herein as a sealed system. The construction of the sealed system is well known and therefore not described in detail herein, and the sealed system components are operable at varying speeds to force cold air through the refrigerator subject to the following control scheme.

Figure 4:
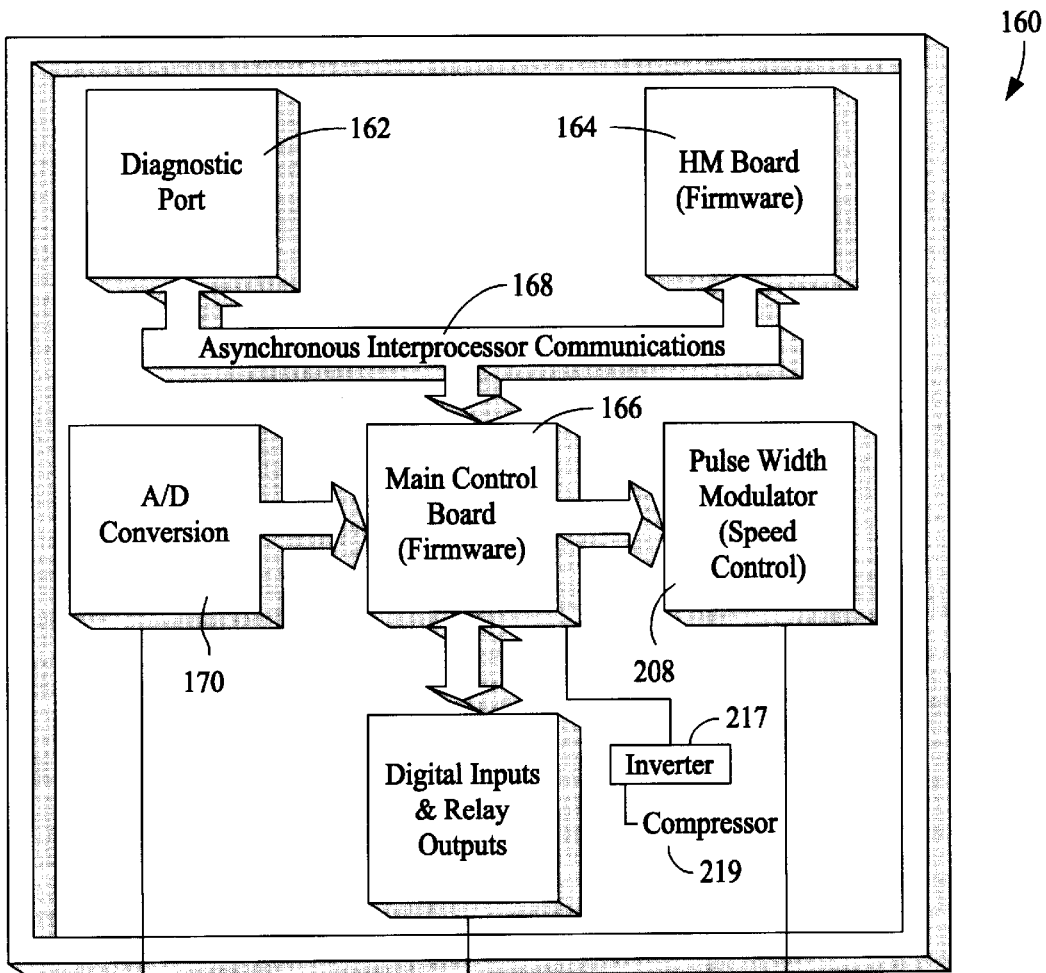
FIG. 4 is a block diagram of a refrigerator controller.

FIG. 4 illustrates an exemplary controller 160 in accordance with one embodiment that may be employed in place of controller 12 (shown in FIG. 1). Controller 160 can be used, for example, in refrigerators, freezers and combinations thereof, such as, for example side-by-side refrigerator 100 (shown in FIG. 3).

Controller 160 includes a diagnostic port 162 and a human machine interface (HMI) board 164 coupled to a main control board 166 by an asynchronous interprocessor communications bus 168. An analog to digital converter ("A/D converter") 170 is coupled to main control board 166. A/D converter 170 converts analog signals from a plurality of sensors including one or more fresh food compartment temperature sensors 172, a quick chill/thaw feature pan (i.e., pan 122 shown in FIG. 3 or other temperature controlled compartment) temperature sensors 174, freezer temperature sensors 176, external temperature sensors (not shown in FIG. 4), and evaporator temperature sensors 178 into digital signals for processing by main control board 166.

In an alternative embodiment (not shown), A/D converter 170 digitizes other input functions (not shown), such as a power supply current and voltage, brownout detection, compressor cycle adjustment, analog time and delay inputs (both use based and sensor based) where the analog input is coupled to an auxiliary device (e.g., clock or finger pressure activated switch), sensing of the compressor sealed system components for diagnostics and power/energy optimization. Further input functions include external communication via IR detectors or sound detectors, HMI display dimming based on ambient light, adjustment of the refrigerator to react to food loading and changing the air flow/pressure accordingly to ensure food load cooling or heating as desired, and altitude adjustment to ensure even food load cooling and enhance pull-down rate at various altitudes by changing fan speed and varying air flow.

Digital input and relay outputs correspond to, but are not limited to, a condenser fan speed 180, an evaporator fan speed 182, a crusher solenoid 184, an auger motor 186, personality inputs 188, a water dispenser valve 190, encoders 192 for set points, a defrost heater 196, a door detector 198, a mullion damper 200, feature pan air handler dampers 202, 204, and a quick chill/thaw feature pan heater 206. Main control board 166 also is coupled to a pulse width modulator 208 for controlling the operating speed of a condenser fan 210, a fresh food compartment fan 212, an evaporator fan 214, and a quick chill system feature pan fan 216. Additionally, main control board 166 is coupled to an inverter 217 that is, in turn, coupled to a compressor 219. Inverter 217 is supplied continuously with AC power and used to control compressor 219 at a selected speed in response to a signal from main control board 166, such as square wave of 0–5 V in one embodiment. As such, compressor 219 is operable at a plurality of speeds.

Figure 5A:
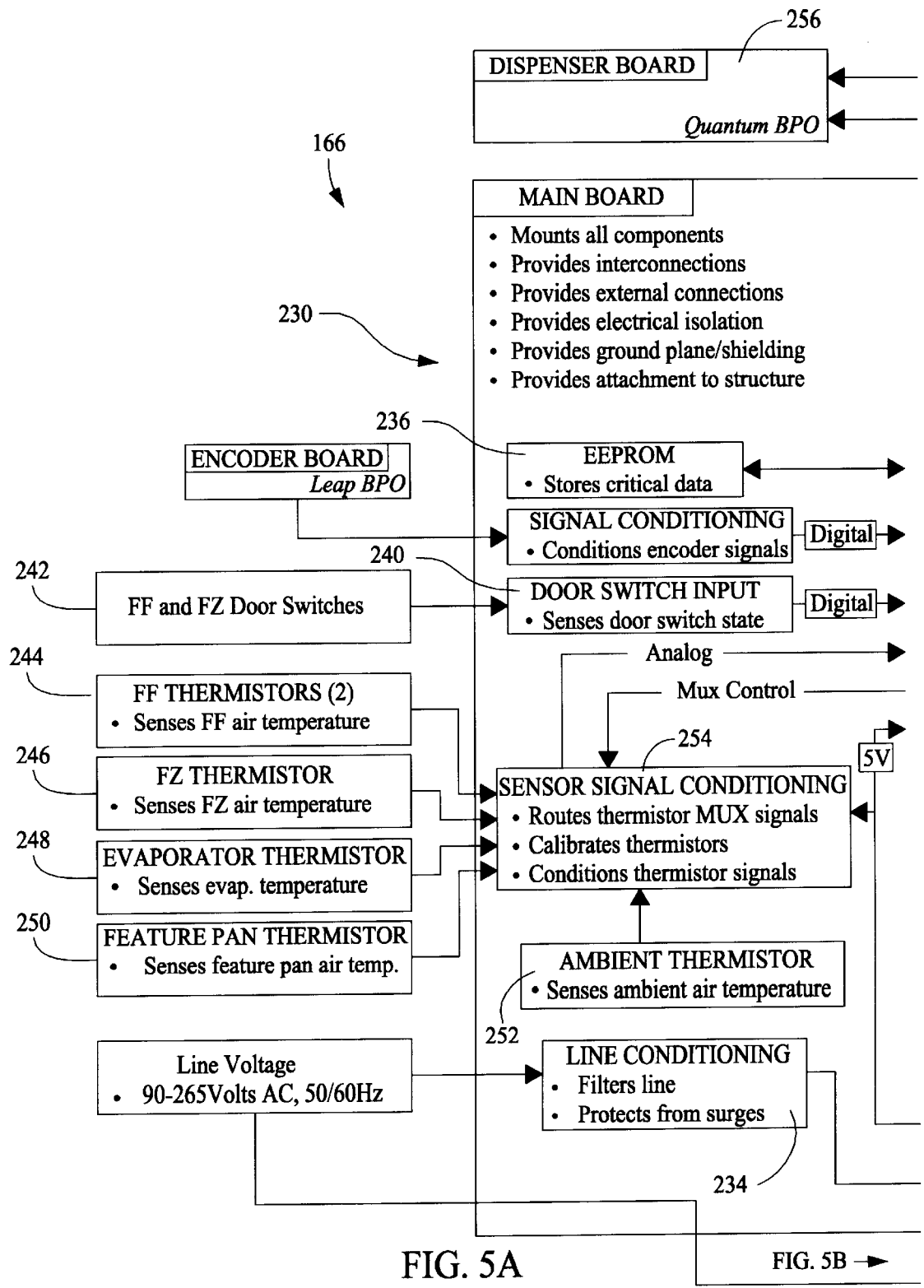
Figure 6:
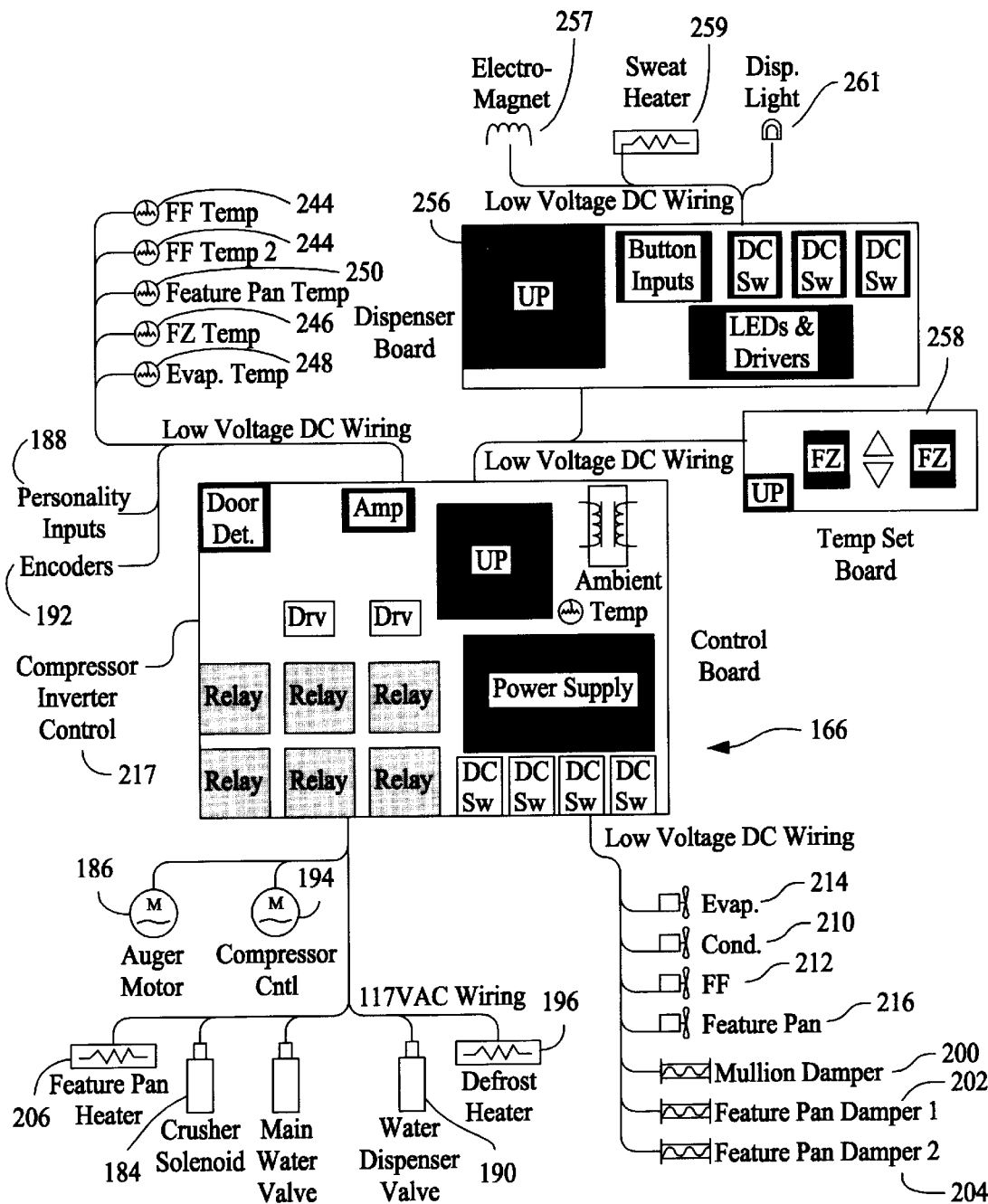
FIG. 6 is a block diagram of the main control board shown in FIG. 4.

FIGS. 5A–5C, and 6 are more detailed block diagrams of main control board 166. As shown in FIGS. 5A, 5B, and 6, main control board 166 includes a processor 230. Processor 230 performs temperature adjustments/dispenser communication, AC device control, signal conditioning, microprocessor hardware watchdog, and EEPROM read/write functions. In addition, processor 230 executes many control algorithms including sealed system control, evaporator fan control, defrost control, feature pan control, fresh food fan control, stepper motor damper control, water valve control, auger motor control, cube/crush solenoid control, timer control, and self-test operations.

Processor 230 is coupled to a power supply 232 which receives an AC power signal from a line conditioning unit 234. Line conditioning unit 234 filters a line voltage which is, for example, a 90–265 Volts AC, 50/60 Hz signal. Processor 230 also is coupled to an EEPROM 236 and a clock circuit 238.

A door switch input sensor 240 is coupled to fresh food and freezer door switches 242, and senses a door switch state. A signal is supplied from door switch input sensor 240 to processor 230, in digital form, indicative of the door switch state. Fresh food thermistors 244, a freezer thermistor 246, at least one evaporator thermistor 248, a feature pan thermistor 250, and an ambient thermistor 252 are coupled to processor 230 via a sensor signal conditioner 254. Conditioner 254 receives a multiplex control signal from processor 230 and provides analog signals to processor 230 representative of the respective sensed temperatures. Processor 230 also is coupled to a dispenser board 256 and a temperature adjustment board 258 via a serial communications link 260. Conditioner 254 also calibrates the above-described thermistors 244, 246, 248, 250, and 252.

Dispenser board 256 outputs to an electromagnet 257, a heater 259, and a dispenser light 261 for dispensing operations of ice and water according to known techniques. Sweat heater 259 is a known low voltage heating element that prevents undesirable condensation on dispenser components.

Processor 230 provides control outputs to a DC fan motor control 262, a DC stepper motor control 264, a DC motor control 266, and a relay watchdog 268. Watchdog 268 is coupled to an AC device controller 270 that provides power to AC loads, such as to water valve 190, cube/crush solenoid 184, auger motor 186, feature pan heater 206, and defrost heater 196. DC fan motor control 266 is coupled to evaporator fan 214, condenser fan 210, fresh food fan 212, and feature pan fan 216 (such as drawer 122 shown in FIG. 3). DC stepper motor control 266 is coupled to mullion damper 200, and DC motor control 266 is coupled to one of more sealed system dampers. Additionally, control board 166 is coupled, directly or indirectly to various lighting assemblies and components, for illuminating fresh food compartment 102 (shown in FIG. 3), freezer compartment 104 (shown in FIG. 3), feature pan 216 (such as drawer 122 shown in FIG. 3), etc.

Periodically, controller 160 reads fresh food compartment thermistors 244 and freezer thermistor 246 to determine respective temperatures of fresh food compartment 102 (shown in FIG. 3) and freezer compartment 104 (shown in FIG. 3). Based on the determined temperatures of compartments 102, 104, and user control inputs for fresh food compartment temperature and freezer compartment temperature, controller 160 makes control algorithm decisions, including selection of operating speed of the various sealed system components to achieve the input temperatures and low energy mode decisions as described above in relation to FIG. 2.

In accordance with the foregoing algorithm (shown in FIG. 2) the various operative and energy consuming components of the controller input and output devices may be classified as "main" , "auxiliary" or "peripheral" and the classifications may be stored in controller memory so that controller 166 may execute the normal mode and the low energy mode.

For example, in one exemplary embodiment, condenser fan speed control 180, evaporator fan speed control 182, compressor control 194, controls for mullion damper 200, pulse width modulator 208 for controlling the operating speed of compressor 219, condenser fan 210, fresh food compartment fan 212, evaporator fan 214, and encoders 192 for set points may be designated as main devices. Auxiliary fans and dampers in fresh food compartment 102 and freezer compartment 104, defrost heater 196, and door detector 198 may be designated as auxiliary devices. Ice crusher solenoid 184, auger motor 186, personality inputs 188, water dispenser valve 190, dispenser electromagnet 257, dispenser heater 259, dispenser light 261 and quick chill system feature pan fan 216 (e.g., drawer 122 shown in FIG. 3) together with the associated feature pan air handler dampers 202, 204 and quick chill/thaw feature pan heater 206 may be designated as peripheral devices.

Of course, other classifications and designations of these and other components and devices are possible without departing from the scope of the present invention.

Therefore, when the low energy mode is activated, controller 166 operates the main devices, and alters operation of the auxiliary and peripheral devices according to algorithm 40 (shown in FIG. 2) for selective reduction of energy by auxiliary and peripheral devices. As described above, the low energy mode is activated in one embodiment through selection of the fresh food compartment and/or freezer compartment temperature set points. As such, the low energy mode is self-activated in the refrigeration controls in an exemplary embodiment and requires no separate actuation or consideration by refrigerator users. A convenient and energy efficient low energy mode is therefore provided for a refrigerator.

While the invention has been described in terms of various specific embodiments, those skilled in the art will recognize that the invention can be practiced with modification within the spirit and scope of the claims.

What is claimed is:

1. A method for operating an appliance in an energy conservation mode, the appliance comprising a number of peripheral devices and auxiliary components ancillary to main operation of the appliance, said method comprising:

reducing power to at least some of the peripheral devices and auxiliary components in an energy conservation mode corresponding to an appliance set point, thereby reducing energy consumption by the peripheral devices and auxiliary components;

wherein the appliance is a refrigerator, the peripheral devices including a quick chill compartment, said reducing power to at least some of the peripheral devices comprising disabling at least the quick chill compartment.

2. A method for operating an appliance in an energy conservation mode, the appliance comprising a number of peripheral devices and auxiliary components ancillary to main operation of the appliance, said method comprising:

reducing power to at least some of the peripheral devices and auxiliary components in an energy conservation mode corresponding to an appliance set point, thereby reducing energy consumption by the peripheral devices and auxiliary components;

wherein the appliance is a refrigerator, the auxiliary components including at least one auxiliary fan, said reducing power to at least some of the auxiliary components comprising disabling at least the auxiliary fan.

3. A method for operating an appliance in an energy conservation mode, the appliance comprising a number of peripheral devices and auxiliary components ancillary to main operation of the appliance, said method comprising:

reducing power to at least some of the peripheral devices and auxiliary components in an energy conservation mode corresponding to an appliance set point, thereby reducing energy consumption by the peripheral devices and auxiliary components;

wherein the appliance is a refrigerator, the peripheral devices including a dispenser including a heater, said reducing power to at least some of the peripheral devices comprising disabling at least the heater.

4. A method for operating an appliance in an energy conservation mode, the appliance comprising a number of peripheral devices and auxiliary components ancillary to main operation of the appliance, said method comprising:

reducing power to at least some of the peripheral devices and auxiliary components in an energy conservation mode corresponding to an appliance set point, thereby reducing energy consumption by the peripheral devices and auxiliary components;

wherein the appliance is a refrigerator, the peripheral devices including a dispenser including a heater, said reducing power to the peripheral devices comprising reducing a duty cycle of the heater.

5. A method for operating a refrigerator in an energy conservation mode, the refrigerator including at least one refrigeration compartment and a sealed system for forcing cold air therethrough, the refrigerator further including a number of peripheral devices and auxiliary components; said method comprising:

operating the sealed system at normal temperature settings in a normal mode of operation; and disabling at least one of the peripheral devices and auxiliary components at a predetermined temperature setting corresponding to an energy conservation mode, thereby preventing the disabled peripheral device and auxiliary component from consuming energy.

6. A method in accordance with claim 5 wherein the peripheral devices and auxiliary components includes at least one of an auxiliary fan, a dispenser heater, and a temperature controlled storage department, said disabling at least one of the peripheral devices comprising de-energizing at least one of the auxiliary fan, the dispenser heater, and the temperature controlled storage department.

7. A method in accordance with claim 5 wherein the peripheral devices and auxiliary components includes a lighting assembly, said disabling at least one of the peripheral devices comprising de-energizing the lighting assembly.

8. A method in accordance with claim 5 wherein the peripheral devices and auxiliary components includes a user interface, said disabling at least one of the peripheral devices comprising disabling the user interface.

9. A method for controlling a refrigerator, the refrigerator including at least one refrigeration compartment and a sealed system for forcing cold air therethrough, the refrigerator further including a number of peripheral devices and auxiliary components, the refrigerator operable at a number of temperature settings through a controller, said method comprising:

accepting a target temperature set point for the at least one refrigeration compartment;

operating the sealed system in normal operation according to the accepted setting;

when a designated low energy mode setting is accepted, suspending operation of at least one of the peripheral devices and auxiliary components, thereby preventing the disabled peripheral device and auxiliary component from consuming energy; and operating the peripheral devices and auxiliary components on demand when the accepted setting is other than the designated setting.

10. A method in accordance with claim 9 wherein suspending operation of at least one of the peripheral devices and auxiliary components comprises de-energizing at least one of an auxiliary fan, a dispenser heater, and a temperature controlled storage department.

11. A method in accordance with claim 10 further comprising reducing a duty cycle of at least another of the peripheral devices and auxiliary components.

12. A controller for a refrigerator including at least one refrigeration compartment, a sealed system for cooling the at least one compartment, and a number of peripheral devices and auxiliary components ancillary to cooling functions of the refrigerator, said controller configured to be operatively coupled the sealed system and to each of the peripheral devices and auxiliary components, said controller configured to:

operate said sealed system, peripheral devices, and auxiliary components in a normal mode of operation according to user preferences and;

adjust operation of said peripheral devices and auxiliary components when a low energy mode is activated through selection of a predetermined sealed system set point, thereby reducing energy consumption by the peripheral devices and auxiliary devices.

13. A controller in accordance with claim 12 wherein said controller is configured to disable operation of the peripheral devices and auxiliary components when in the low energy mode.

14. A controller in accordance with claim 12 wherein said controller is configured to reduce a duty cycle of energization of the peripheral devices and auxiliary components when in the low energy mode.

15. A refrigerator comprising:

a cabinet;

at least one refrigeration compartment within said cabinet;

a sealed system in flow communication with said cabinet;

a controller coupled to the sealed system for controlling an operating temperature of said at least one refrigeration compartment; and at least one device coupled to said controller and ancillary to operation of said sealed system, said controller configured to control said sealed system and said device in a normal mode corresponding to a normal temperature set point, and to operate said device in a low energy mode corresponding to a low energy mode temperature set point to reduce energy consumption by said device.

16. A refrigerator in accordance with claim 15 wherein said at least one device comprises one of a temperature controlled storage compartment, a dispenser heater and an auxiliary fan.

17. A refrigerator in accordance with claim 15 wherein said at least one device is disabled in said low energy mode.

18. A refrigerator in accordance with claim 15 wherein a duty cycle of said at least one device is reduced.

\* \* \* \* \*

UNITED STATES PATENT AND TRADEMARK OFFICE
CERTIFICATE OF CORRECTION

PATENT NO. : 6,684,656 B2
DATED : February 3, 2004
INVENTOR(S) : Gray et al.

It is certified that error appears in the above-identified patent and that said Letters Patent is hereby corrected as shown below:

<u>Title page,</u>
Item [75], Inventors, after "Steven J. Gray, Erie, PA (US);" delete "Martin M. Zenter" and insert therefor -- Martin M. Zentner --.

Signed and Sealed this

Fifteenth Day of November, 2005

JON W. DUDAS
*Director of the United States Patent and Trademark Office*